(12) United States Patent
Bifulco

(10) Patent No.: US 10,298,707 B2
(45) Date of Patent: May 21, 2019

(54) METHOD FOR MONITORING A STATUS IN FORM OF PRESENCE AND/OR ABSENCE OF A NETWORK ENTITY

(71) Applicant: NEC Europe Ltd., Heidelberg (DE)

(72) Inventor: Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 15/320,789

(22) PCT Filed: Jun. 26, 2014

(86) PCT No.: PCT/EP2014/063525
§ 371 (c)(1),
(2) Date: Dec. 21, 2016

(87) PCT Pub. No.: WO2015/197120
PCT Pub. Date: Dec. 30, 2015

(65) Prior Publication Data
US 2017/0142212 A1    May 18, 2017

(51) Int. Cl.
*H04L 29/08* (2006.01)
*H04L 12/26* (2006.01)
*H04L 12/24* (2006.01)

(52) U.S. Cl.
CPC ............ *H04L 67/24* (2013.01); *H04L 41/12* (2013.01); *H04L 43/0811* (2013.01); *H04L 43/10* (2013.01)

(58) Field of Classification Search
CPC ......... H04L 67/24; H04L 41/12; H04L 43/08; H04L 43/10
See application file for complete search history.

(56) References Cited

U.S. PATENT DOCUMENTS

| 7,464,168 | B1 * | 12/2008 | Abdelaziz ............. H04L 67/104 709/229 |
| 2005/0009542 | A1 | 1/2005 | Oprescu-Surcobe et al. |
| 2012/0264443 | A1 * | 10/2012 | Ng ........................ H04W 60/04 455/450 |

OTHER PUBLICATIONS

"SDN Architecture Overview", Dec. 12, 2013 (Dec. 12, 2013), XP055139949.

(Continued)

*Primary Examiner* — Glenford J Madamba
(74) *Attorney, Agent, or Firm* — Leydig, Voit & Mayer, Ltd.

(57) ABSTRACT

A method for monitoring a status in a form of presence and/or absence of a subscribed network entity in a network by a presence service, wherein the network is a software defined network having one or more forwarding elements being configurable for recognizing and applying one or more actions on packets being forwarded by the forwarding elements and one or more network entities, includes monitoring the status of the subscribed network entity. The monitoring the status of the subscribed network entity includes providing the presence service with a status update of the selected network entity only when at least one of the one or more forwarding elements, to which the selected network entity is directly connected, has detected a change in the presence status of the subscribed network entity; and dropping packets of the subscribed network entity destined for the presence service.

16 Claims, 10 Drawing Sheets

(56) References Cited

OTHER PUBLICATIONS

"Stage 2—Presence using Simple ; OMA-PAG-SIMPLE-AD-V1_1_0-20040723-D", OMA-PAG-SIMPLE-AD-V1_1_0-20040723-D, Open Mobile Alliance (OMA), 4330 La Jolla Village Dr., Suite 110 San Diego, CA 92122; USA, No. 1.0 Jul. 23, 2004 (Jul. 23, 2004), pp. 1-50, XP064156747.

* cited by examiner

METHOD FOR MONITORING A STATUS IN FORM OF PRESENCE AND/OR ABSENCE OF A NETWORK ENTITY

CROSS REFERENCE TO RELATED APPLICATIONS

This application is a U.S. National Stage Application under 35 U.S.C. § 371 of International Application No. PCT/EP2014/063525 filed on Jun. 26, 2014. The International Application was published in English on Dec. 30, 2015 as WO 2015/197120 A1 under PCT Article 21(2).

FIELD

The present invention relates to a method for monitoring a status in form of presence and/or absence of a network entity in a network by a presence service, preferably wherein the network is a software defined network, comprising one or more forwarding elements being configurable for recognizing of and applying one or more actions on packets being forwarded by said forwarding elements and one or more network entities wherein said network entities are connectable to one or more of the forwarding elements, preferably wherein each of the network entities is connected to one or more forwarding elements directly.

The present invention further relates to a presence service entity for providing a presence service for monitoring a status in form of presence and/or absence of a network entity in a network, preferably wherein the network is a software defined network, comprising one or more forwarding elements being configurable for recognizing of and applying one or more actions on packets being forwarded by said forwarding elements and one or more network entities wherein said network entities are connectable to one or more of the forwarding elements, preferably wherein each of the network entities is connected to one or more forwarding elements directly.

The present invention even further relates to a network, preferably a software-defined network with a presence service for monitoring a status in form of presence and/or absence of a network entity in a network, preferably wherein the network is a software defined network, comprising one or more forwarding elements being configurable for recognizing of and applying one or more actions on packets being forwarded by said forwarding elements and one or more network entities wherein said network entities are connectable to one or more of the forwarding elements, preferably wherein each of the network entities is connected to one or more forwarding elements directly.

BACKGROUND

Typical examples for network applications using a presence service are chat and messaging applications monitoring the presence status of their users. Other more advanced examples include systems integrating reliability mechanisms. For instance fault tolerant systems may include two servers, one working to serve users' requests, while the other server is idle, in order to substitute the first server upon failing. A presence service in this case would provide a notification in case the first server stops working, i.e. when it is not present anymore, so that the second idle server can immediately substitute the first server. Other examples include mobile IP and IPSec presence services (available under http://www.pasieronen.com/publications/NRCTR2008002.pdf).

In the non-patent literature of XMPP according to RFC 3921 (which is available under http://www.rfc-editor.org/rfc/pdfrfc/rfc6121.txt.pdf) an example of a protocol is shown supporting a presence service. Conventional presence services, for example in a computer network are provided such that an entity which is monitored by the presence service sends periodic messages to the presence service. The periodic messages are usually called keepalive messages or heartbeat messages. The presence service monitors that a keepalive message is received in each predetermined time period. The absence of a keepalive message then indicates that the monitored entity is not present anymore, for example was shut down or is offline from the network.

The keepalive message sending period and the number of missing keepalive messages after which the monitored entity is considered as "absent" are configuration parameters of the presence service which are, for example, shown in further non-patent literature (specifically that available under http://www.cs.bham.ac.uk/~pxt/PAPERS/stillAliveFinal.pdf).

A conventional implementation of a presence service is to use a presence server. The presence server accepts monitoring requests for registering one or more entities to the presence service to activate the corresponding presence monitoring of the registered entities. At the same time the registered entities start sending periodic keepalive messages to the presence service. When a registered entity goes offline, i.e., when the keepalive messages stop reaching the presence service then the presence service changes the status of the registered entity to "absent" and usually the change of the status of a registered entity is notified to an application for performing an action to this information.

The keepalive or heartbeat messages are usually very small messages in terms of bytes which are sent for the sole purpose of "refreshing" the presence status in the presence service. However keepalive messages need to travel from each monitored entity to the presence service and this increases the number of small packets the network has to deliver.

On the other hand the presence service has to collect all these keepalive messages and update the state of the corresponding monitored entity according to the received keepalive packets. Usually also timers are involved that need to be reset at the reception of a corresponding keepalive packet. The presence service hence, needs to scale with the number of keepalive messages that are sent. This is related to the total number of users of the presence service and the keepalive periods.

Further, different applications are required to implement their own presence services because operations of these applications require such a service. However, this causes to deploy plurality of presence services or in other words high costs for an operator of the network.

SUMMARY

In an embodiment, the present invention provide a method for monitoring a status in a form of presence and/or absence of a subscribed network entity in a network by a presence service, wherein the network is a software defined network comprising one or more forwarding elements being configurable for recognizing and applying one or more actions on packets being forwarded by the forwarding elements and one or more network entities, wherein the one or more network entities are connectable to one or more of the forwarding elements. The method includes monitoring the status of the subscribed network entity when the subscribed network entity is discovered by the presence service, wherein the monitoring the status of the subscribed network entity comprises providing the presence service with a status update of the subscribed network entity only when at least one of the one or more forwarding elements, to which the subscribed network entity is directly connected, has detected a change in the presence status of the subscribed network entity; and dropping packets of the subscribed network entity destined for the presence service.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
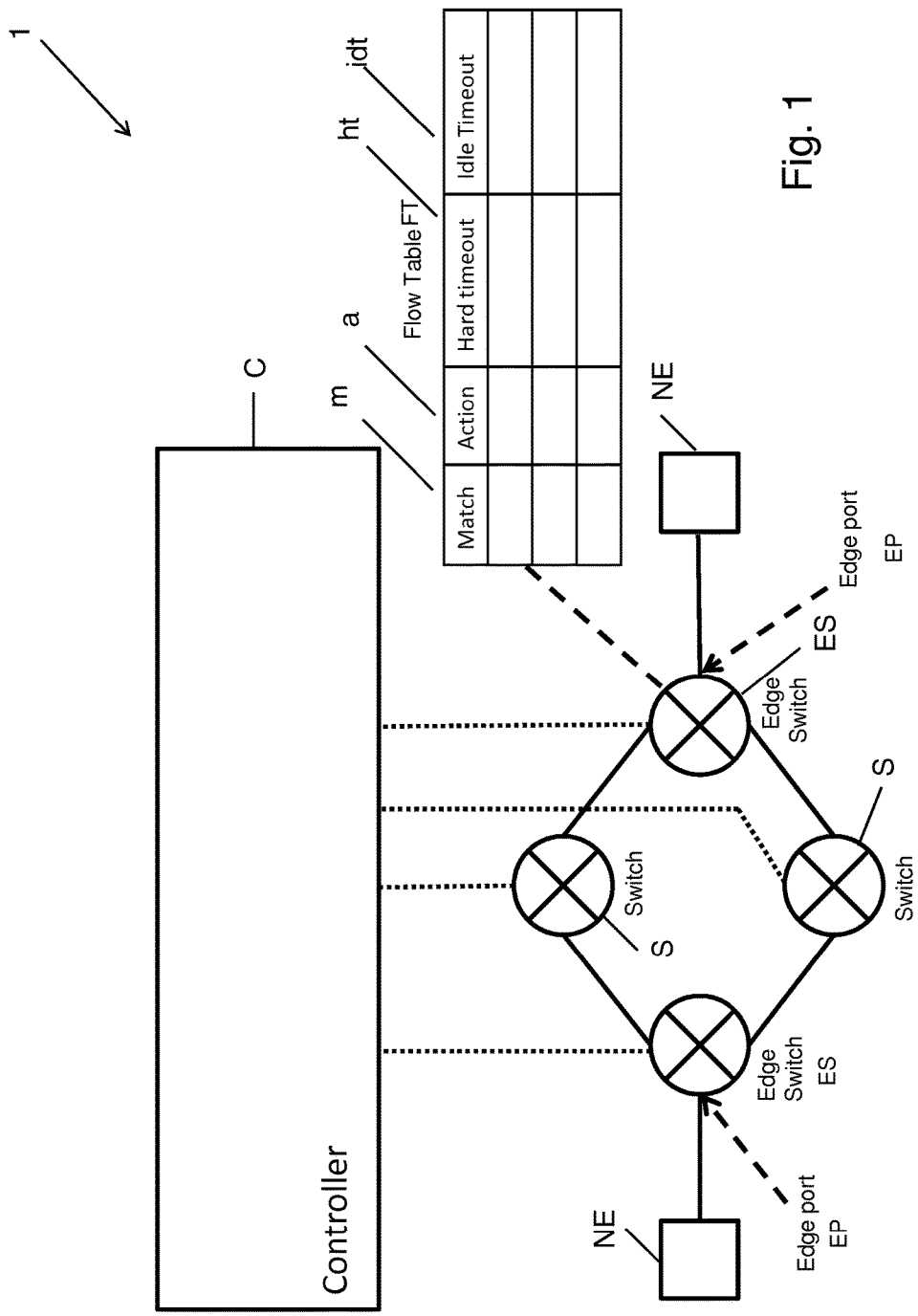
FIG. 1 shows schematically a conventional software defined network.

As described herein, the present invention provides a method for monitoring a status in form of presence and/or absence of a network entity in a network by a presence service and a network which enable a more efficient network usage, in particular network-wide resource usage.

As further described herein, the present invention provides a method for monitoring a status in form of presence and/or absence of a network entity in a network by a presence service and a network which exploit cheap resources of network entities enabling a high number of entities for which a presence service can be provided.

As additionally described herein, the present invention provides a method for monitoring a status in form of presence and/or absence of a network entity in a network by a presence service and a network enabling scaling with a number of status changes instead of scaling with a number of keepalive messages sent.

As also described herein, the present invention provides a method for monitoring a system in form of presence and/or absence of a network entity in a network by a presence service and a network enabling enhanced flexibility and an easy implementation in existing networks.

In an embodiment, the present invention provides a method for monitoring a status in form of a presence and/or absence of a network entity in a network by a presence service is defined, preferably wherein the network is a software defined network, comprising one or more forwarding elements being configurable for recognizing of and applying one or more actions on packets being forwarded by said forwarding elements and one or more network entities wherein said network entities are connectable to one or more of the forwarding elements, preferably wherein each of the network entities is connected to one or more forwarding elements directly.

According to an embodiment, a method is characterized in that when a network entity subscribed to and discovered by the presence service, the status of said network entity is monitored such that a) the presence service is only provided with a status update of said connected network entity when at least one of said one or more forwarding elements, to which said network entity is directly connected, has detected a change in the presence status of the subscribed network entity and that b) packets of said network entity destined for the presence service are dropped.

In an embodiment, the present invention provides a presence service entity for providing a presence service for monitoring a status in form of presence and/or absence of a network entity in a network is defined, preferably wherein the network is a software defined network, comprising one or more forwarding elements being configurable for recognizing of and applying one or more actions on packets being forwarded by said forwarding elements and one or more network entities wherein said network entities are connectable to one or more of the forwarding elements, preferably wherein each of the network entities is connected to one or more forwarding elements directly.

According to an embodiment, a presence service entity is characterized in that when a network entity subscribed to and discovered by the presence service, the status of said network entity is monitored such that a) the presence service is only provided with a status update of said connected network entity when at least one of said one or more forwarding elements, to which said network entity is directly connected, has detected a change in the presence status of the subscribed network entity and that b) packets of said network entity destined for the presence service are dropped.

In an embodiment, a network is provided, preferably a software-defined network with a presence service for monitoring a status in form of presence and/or absence of a network entity in a network, preferably wherein the network is a software defined network, comprising one or more forwarding elements being configurable for recognizing and applying one or more actions on packets being forwarded by said forwarding elements and one or more network entities wherein said network entities are connectable to one or more of the forwarding elements, preferably wherein each of the network entities is connected to one or more forwarding elements directly.

In an embodiment, the presence service is only provided with a status update of said connected network entity when all forwarding elements, to which said network entity is directly connected, have detected a change in the presence status of the subscribed network entity. For example a presence status change may be detected at different times by different forwarding elements, then an identification and coordination either by the network entity and/or by the involved forwarding elements may be performed. After a predetermined number, preferably all of the involved, i.e. all forwarding elements to which the network entity is directly connected, have detected the presence status change, the presence service is provided with a corresponding status update.

As described herein, when a status update of a subscribed entity is necessary only this status update information is provided to the presence service: When the forwarding element has detected a change in the presence status of the subscribed network entity, then only this information is provided to the presence server but not the keepalive packets itself enabling in particular to use keepalive packets only at the very edge of the network and thus the network-wide resources usage is optimized.

As described herein, in general a conventional poll system is substituted with a push one, where only status changes are notified, in contrast to conventional methods and networks in which status information needs to be periodically refreshed.

As described herein, inexpensive resources at forwarding elements or network switches are exploited to maintain a distributed state for a high number of potential entities using a presence service compared to conventional systems which would require a consistent number of dedicated resources, for example several servers at a datacenter.

As described herein, the present invention scales with the number of status changes instead of scaling with the number of keepalive messages sent. Thus the amount of data to be exchanged in the network is reduced.

As described herein, offloading to the network of a service is enabled that otherwise would be provided by applications at the edge of the network. Thus, the network can then consolidate the service for several customers.

As described herein, application development is easier since the presence service can be outsourced, for example to the manufactures of the forwarding elements or switches respectively.

In general, the terms "network", "network entity", "switch", "port", "forwarding element", etc. as used herein are not limited in any way to a physical instantiation of the corresponding term. In particular any entity may also be a virtual instantiation, for example a virtual machine or the like.

The terms "presence service" and "presence manager" may be used interchangeably throughout in the description. In particular a presence server being a virtual or physical entity providing a presence service is hosting a presence manager providing a management of the presence service.

According to a preferred embodiment for performing the steps a) and b) described above, a rule on the forwarding element is installed to identify packets of said network entity destined for the presence service and a drop action for said packets is performed when packets match said rule. This enables in an efficient way to perform steps a) and b). By installing said rule on the forwarding element packets for the presence service can be easily identified by an edge forwarding element, i.e. a forwarding element to which a network entity is directly connected.

According to a further preferred embodiment a network entity is subscribed by sending a request to the presence service comprising identity information of said network entity and matching information to said presence service. This allows an efficient subscription of the network entity, so that the presence service as well as the edge forwarding element can easily identify packets from the subscribed network entity.

According to a further preferred embodiment the request comprises keepalive information, preferably a keepalive period indicating the frequency at which said entity provides keepalive messages. This provides the presence service information of the frequency, in which a subscribed network entity will send keepalive messages. Thus, the present service knows which type of keepalive messages is provided and, for example at which frequency, enabling an easy determination when the subscribed network entity may be considered as "absent" or "offline".

According to a further preferred embodiment the matching information is generated by the presence service. The presence service can then generate the packet match information during the subscription operation and provide it to a user of the network entity. An advantage is that when the matching information is generated by the presence service the presence service can generate it according to the requirements of a corresponding forwarding element without having to translate or amend the matching information provided by the network entity to be subscribed for example.

According to a further preferred embodiment the matching information includes one or more values of header fields of a packet. This enables a simple but very efficient matching, i.e. identification of packets destined for the presence service of a corresponding subscribed network entity.

According to a further preferred embodiment a subscription of a network entity at the presence service expires after a certain expiration time and/or upon explicit request. This enables a flexible handling of subscription. For example when the subscription has an expiration time then after a certain time period and preferably without a reception of keepalive messages or status updates the corresponding network entity device is unsubscribed. Therefore an efficient resource management is provided. Explicit cancellation provides that the network entity is subscribed as long as the presence service obtains no corresponding cancellation request enabling for example to maintain the description even if, for example a longer period of network problems occurs. Thus a repeated subscription and a discovery procedure for the still subscribed network entity is not needed.

According to a further preferred embodiment the subscription of a network entity to a presence service is initiated by a user of the network entity, preferably by delegating the request for submission to a dedicated entity. When the subscription is initiated by a user then the user has full control about the use of the network entity to be subscribed and its applications, i.e. the user has to allow if a presence service should be used. By delegating the request for submission to a dedicated entity, the user has simply to send an initiation message to a dedicated entity without having to know the full details of the subscription and discovery process for example.

According to a further preferred embodiment for delegating the request for submission to a dedicated entity a signed delegation certificate is provided for said dedicated entity. This enables for example that a centralized service or entity like a VoIP Service can provide certificates to local VoIP applications. The user of the VoIP application can then subscribe the VoIP application to a presence service without having to know the details of the presence service subscription routine enabling a simpler use of a presence service for a user. On the other hand the VoIP Service can control the type or the number of users to be allowed for using the VoIP application by the distribution of these certificates.

According to a further preferred embodiment the presence service stores at least temporarily a current location of said subscribed network entity, preferably specified indirectly, preferably by a forwarding element ID of the forwarding element to which said network entity is connected to. This enables the presence service to easily locate corresponding network entities as well as local connection information or the network entities connected to, for example an edge switch.

According to a further preferred embodiment information of monitored entities is stored by the presence service. This allows the presence service to provide quickly to applications for example the status of monitored entities when such information is requested.

According to a further preferred embodiment said installed rule has an idle timeout, preferably related to an offline detection delay of the presence service. This enables in an easy way that as long as the subscribed network entity sends keepalive messages according to the specified keepalive period the corresponding rule does not expire since it matches the keepalive messages and resets the idle timeout. When keepalive messages are missing then the rule will be deleted because of the idle timeout. This enables an efficient usage of resources in the edge switch or edge forwarding element which is usually limited, so that rules which are not required anymore are deleted.

According to a further preferred embodiment the presence service as well as a controller of the forwarding elements is informed when the idle timeout has caused a deletion of said installed rule. This ensures that the involved edge switches are configured to notify the controller and in turn the presence service in case of for example a rule deletion. Therefore, if the rule is deleted a notification is generated and sent to the presence service. The presence service then uses this notification to update for example a flow table with entries of monitored network entities and then changes the corresponding network entity status to offline.

According to a further preferred embodiment when the subscribed network entity changes its location to a different forwarding element, the presence service deletes the rule on the previous forwarding element and installs said rule on said different forwarding element, wherein said different forwarding element initiates an update discovery of said network entity connected to said different forwarding element. This enables in an efficient way to allow a network entity to change its location while remaining online. In such a case the network entity may send the keepalive messages to a different edge port. The presence service may then use the information of the corresponding information message of the edge forwarding element to update the location value in a location table, to delete the corresponding rule from the old location and to install it at the new location. Of course in this case the user may not specify a location for the network entity during the entity subscription operation.

FIG. 1 shows schematically a conventional software defined network. In more detail, FIG. 1 shows a plurality of switches (ES, S), which are connected with each other to forward packets of network entities (NE). Each switch (ES, S) has a control interface that can be used to configure them. In FIG. 1 the forwarding elements in form switches (S, ES) are controlled by a logically centralized controller (C). Of course it would be also possible that the network devices or switches (ES, S) are controlled by a plurality of controllers (C) with the controllers (C) being able to exchange messages among themselves.

The controller (C) is connected to each of the network devices (ES, S) of the network 1 using a control channel. Each network device (ES, S) here in form of switches (S, ES) has a set or number of ports that can be connected to other switches (ES, S) or to end hosts in form of network entities (NE). A port connected to an end host (NE) is here called edge port (EP). A switch that has one or more edge ports (EP) is here called edge switch (ES).

A switch (S, ES) further comprises a flow table (FT) as also shown in FIG. 1 for the second edge switch (ES) on the right side. The flow table (FT) contains a plurality of flow table entries. Such a flow table entry abbreviated with (FTE) comprises a match part m for identifying network packets to which the flow table entry (FTE) is applied, preferably by specifying the values of the network packets header fields, an action part a specifying the action to be applied to the matched network packets, an idle timeout (idt) specifying the time after which the flow table entry (FTE) is deleted if it did not match any network packet and a hard timeout ht which deletes the flow table entry (FTE) after a certain time period or at a certain time independently of any matching of packets or not.

The set of flow table entries FTE in a switch's flow table (FT) defines how the switch (S, ES) forwards or routes packets. An action a of a flow table entry may for example include the sending of packets to the controller (C) through the control channel. The transfer of a network packet from the switch (ES, S) to the controller (C) is called "packet_in" throughout here in the description. These packet_in packets comprise at least the following information: the network packet that generated the packet_in information, the switch identifier from which the packet_in information is sent and the identifier of the switches port (EP) on which the network packet was received. The switch (ES, S) can be configured to notify the controller (C) whenever a flow table entry (FTE) gets deleted.

In particular the network of FIG. 1 may be a software defined network, for example based on OpenFlow technology providing the aforementioned properties. Of course any other network providing the aforementioned properties can preferably be used.

Figure 2:
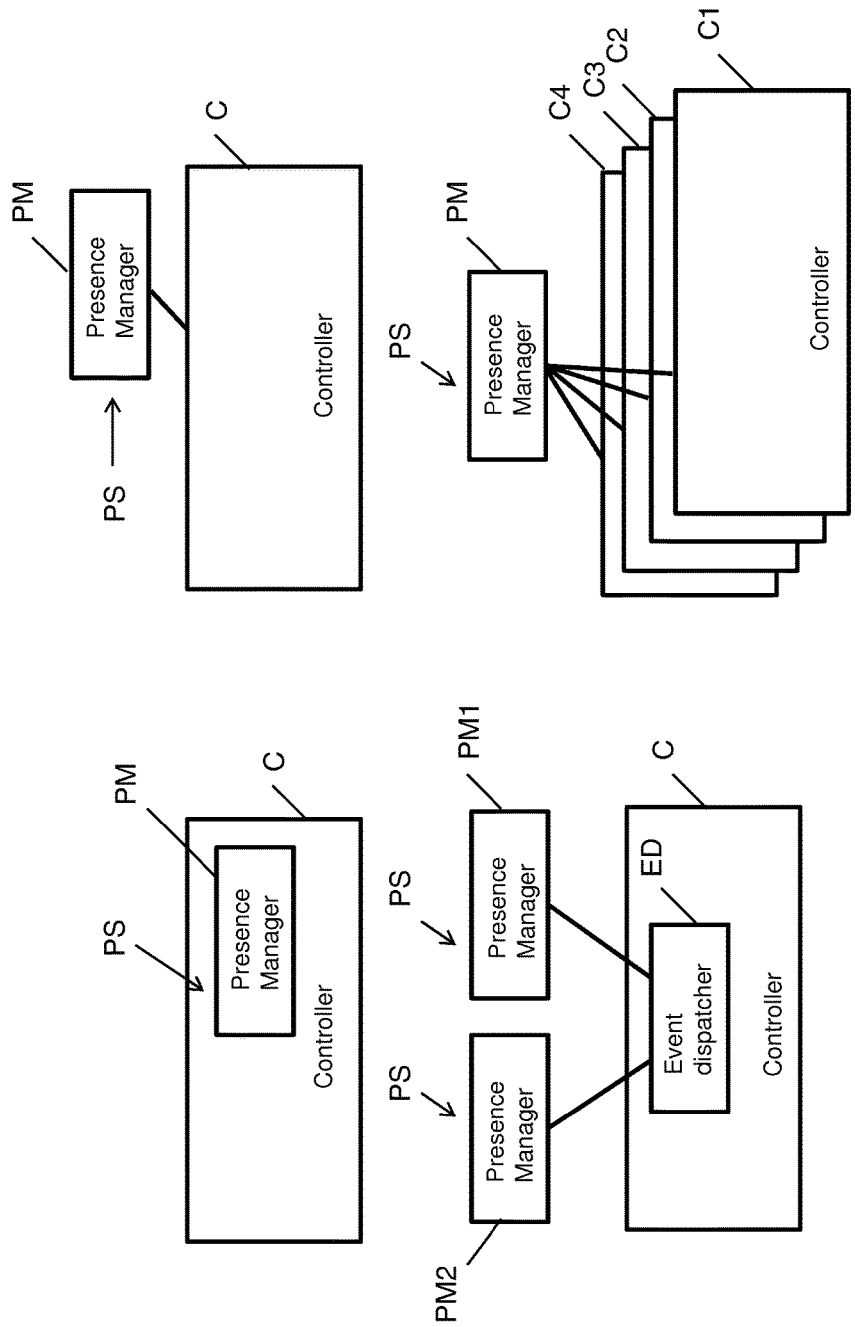
FIG. 2 shows multiple possibilities for deploying a presence service in form of a presence manager in a software defined network according to an embodiment of the invention.

FIG. 2 shows multiple possibilities for deploying a presence service in form of a presence manager in a software defined network. In FIG. 2 deployment possibilities for the presence manager (PM) providing presence services in a software defined network are shown. In the left upper half of FIG. 2 the presence manager (PM) present manager (PM) is deployed within the controller (C) of the network whereas in the right upper half of FIG. 2 the presence manager (PM) is implemented as an external entity which is connected to the controller (C). In the lower left corner of FIG. 2 a plurality of presence managers (PM) are connected to an event dispatcher (ED) of the network controller (C), so that a plurality of present managers PM1, PM2 can be used and coordinated by an event dispatcher (ED) of the network controller (C). In the lower right corner of FIG. 2 a plurality of controllers C1, C2, C3, C4 is connected to a single presence manager (PM) providing the presence service. Therefore a plurality of network controllers C1-C4 can be used with a single presence manager (PM). Further the presence manager (PM) could be enabled to communicate directly with the forwarding elements ES, S via a trusted and secure connection. If the presence manager (PM) is directly implemented in the controller (C) any action required by the presence service on the network 1 is directly executed whereas in case when the presence manager (PM) is implemented as an external entity a request for an action is forwarded to the network controller (C).

Figure 3:
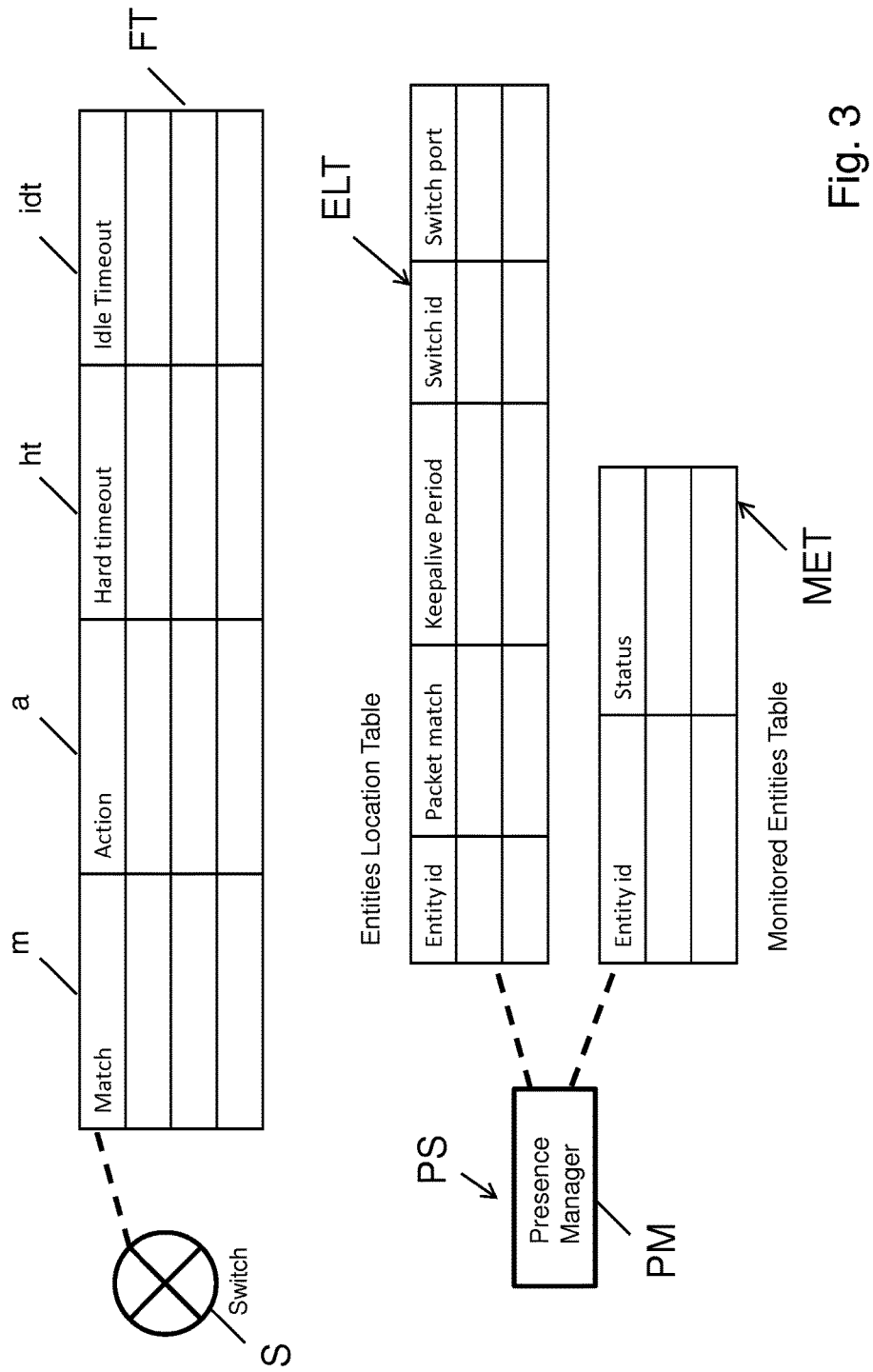
FIG. 3 shows part of a system according to an embodiment of the present invention.

FIG. 3 shows part of a system according to a first embodiment of the present invention. In FIG. 3 a flow table (FT) of a switch and further internal state tables of a presence service (PS) of a presence manager (PM) are shown. In the upper half of FIG. 3 the flow table (FT) of a switch S is shown comprising a match field m, an action field a, a hard timeout ht field and an idle timeout (idt) field as mentioned above. In the lower part of FIG. 3 an entities location table (ELT) and a monitored entities table (MET) is shown: the monitored entities table (MET) is a database in which the presence manager (PM) or the presence service (PS) stores subscribed network entities (NE) with their corresponding ID and their current presence status. Whenever a network entity (NE) is subscribed to the presence service (PS), the presence service (PS) creates an entry in its monitored entities table (MET). The entry contains the network entity ID and its presence status which is set to offline at the subscription stage.

Furthermore an entry in the entities location table (ELT) is added. The entities location table (ELT) comprises the network entity ID, along with its packet match information, keepalive period and current location, preferably specified by a combination of the switch ID and switch port, i.e. edge switch and edge switch port. During the subscription procedure the entry comprises the sole network entity ID and its packet match information.

Any user, for example in form of an application using the presence service (PS) can subscribe a network entity (NE) on the network 1 to be monitored by the presence service (PS) provided by the presence manager (PM). A network entity (NE) in the network 1 may be any software or hardware system being able to send a network packet or being able to delegate to another network entity (NE) in a network packet sending operations.

In the following, a list of examples of network entities (virtual and/or physical) to which the present invention is of course not limited is shown: a computer's network interface card, an operating system, such as GNU/Linux, an application running in an operating system, an embedded device.

Figure 10:
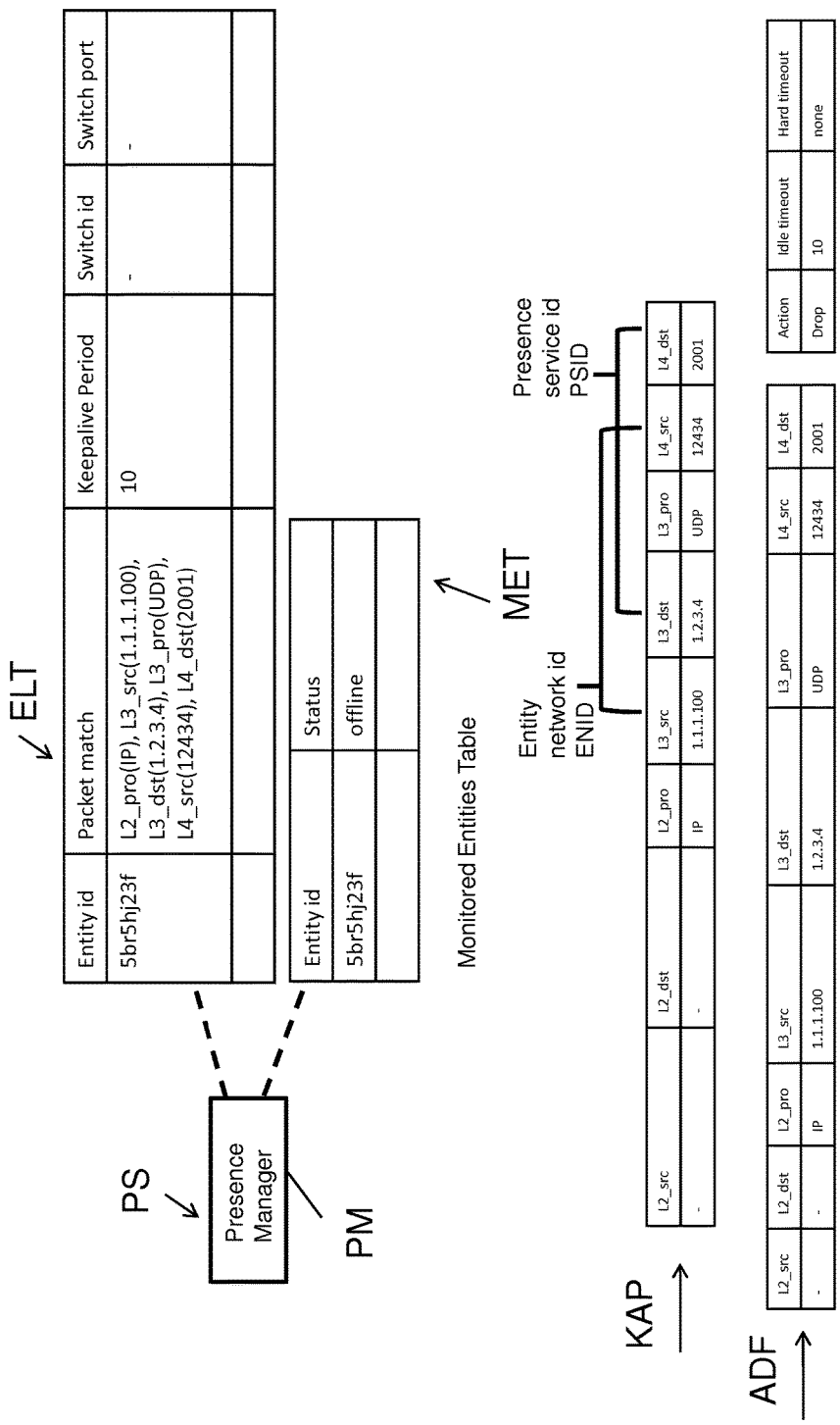
FIG. 10 shows presence service internal state tables and keepalive packets generated according to a method according to an embodiment of the present invention.

For subscribing a network entity (NE) a subscription request is generated by the user of the network entity (NE) and transmitted to the presence service (PS) comprising a network entity identifier and a corresponding "packet match" information. Alternatively the "packet match" information can be generated by the presence service (PS) itself providing it to the user during the subscription procedure. The packet match information is preferably a combination of network packets header field values. Further the subscription request comprises keepalive information in form of a keepalive period indicating the frequency at which a network entity will send keepalive messages. For example, such a keepalive message (KAP) is shown in FIG. 10 in detail.

Preferably a user is required to perform a subscription showing a subscription request for each network entity (NE) the user wants to monitor. Alternatively the user can delegate it to a subscription entity to perform the subscription request itself. Between the user and the corresponding subscription entity a secure communication for subscription operations may be established.

When the network entity (NE) is subscribed to the presence service (PS) an expiration time may be assigned to the subscription or the subscription can be permanent until explicit cancellation. Because of the subscription the presence service (PS) creates as already mentioned above—an entry in its monitored entities table (MET) wherein the created entry comprises the entity ID and its presence status which is set to offline at this subscription stage. Further an entry to the entities location table (ELT) is added. This entities location table (ELT) comprises the entity ID along with its packet match information, keepalive period and current location specified by the combination of switch ID and switch port of an edge switch (ES). During subscription the entry comprises the sole entity ID and its packet match information.

Figure 4:
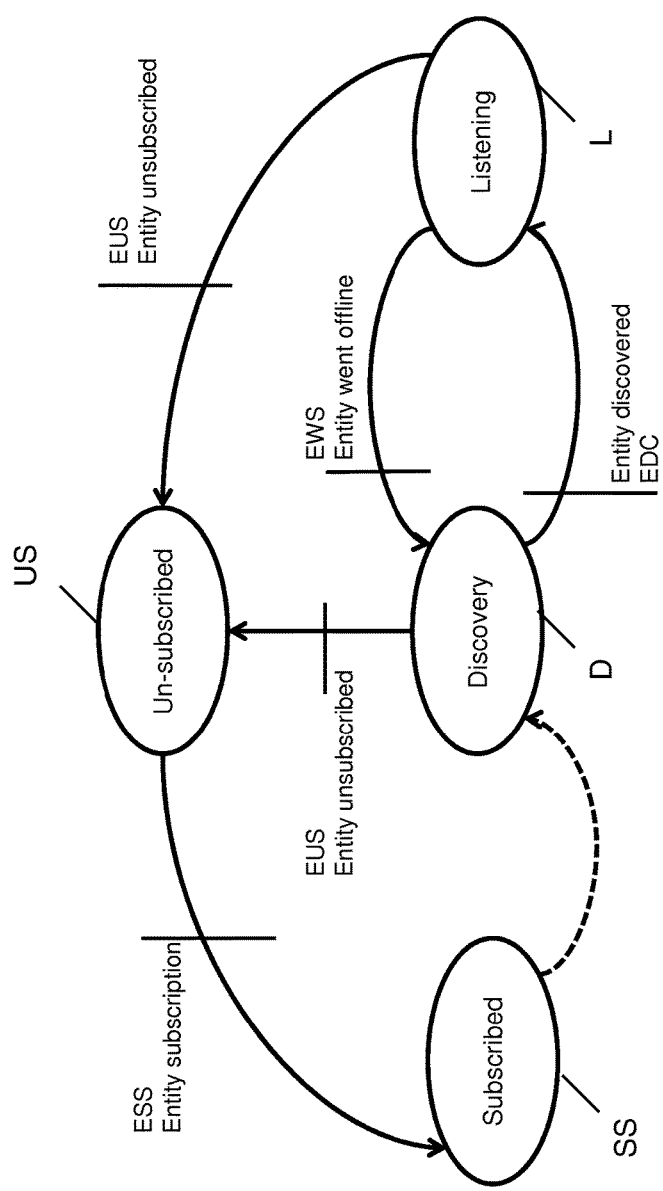
FIG. 4 shows steps of a method according to an embodiment of the present invention.

FIG. 4 shows steps of a method according to a second embodiment of the present invention. In FIG. 4 a representation of possible states in which an entity managed by the presence service (PS) can be is shown. At the beginning a network entity (NE) is in the status un-subscribed US. When a user would like to have the network entity (NE) monitored he performs as mentioned above an entity subscription process ESS. Upon successful subscription, the network entity (NE) is then in the state subscribed SS. After a successful subscription, the presence service (PS) performs two additional phases, here discovery D and listening L. Said phases D, L are performed for each subscribed network entity (NE) until such network entity (NE) stops to be monitored by the presence service (PS), for example until subscription of this network entity (NE) is cancelled.

The discovery phase (D) starts after the subscription phase has been performed. The presence service (PS) requires the subscribed network entity (NE) to periodically send a network packet in form of a keepalive message with header values as specified during a subscription operation in the "packet match" information. In this discovery phase (D) the presence service (PS) checks for the reception of a packet_in message generated because of a keepalive message with such header values was received by the corresponding edge forwarding element.

To enable a reception of packet_in messages the controller (C) may install a flow table entry (FTE) with a corresponding action a in each of the edge switches (ES). Alternatively during the subscription request ESS the presence service (PS) may ask for the location of the network entity (NE) to be monitored so that packet_in message generation can be enabled on the sole edge port (EP) to which the subscribed network entity (NE) is connected. When the packet_in message with the keepalive message is received, the presence service (PS) discovers (reference sign EDC) the presence of the network entity (NE) at a given switch's edge port (EP). The corresponding entry in the entities location table (ELT) is updated with this information and the status entry in the monitored entities table (MET) is turned to online.

After the subscribed network entity is discovered EDC the listening phase (L) starts. The presence service (PS) installs an absence detection flow table entry (ADF) at the edge switch (ES) where the network entity (NE) has been discovered. The match part of the absence detection flow table entry (ADF) is set according to packet match information stored in the entities location table (ELT) while its action is just to drop the received packets destined for the presence manager or presence service respectively.

Furthermore the absence detection flow table entry (ADF) may comprise an idle timeout (idt) whose value is set according to the agreement reached by the presence service (PS) and the user (U) during the entities subscription request (ESS), preferably wherein the timeout value had a direct relationship with the offline detection delay of the presence service (PS).

As long as the subscribed network entity (NE) sends keepalive messages according to the specified keepalive period, the absence detection flow table entry (ADF) does not expire since it matches the keepalive messages and resets the idle timeout (idt). Here it is assumed that a subscribed network entity (NE) is offline when the keepalive messages are not sent anymore. The absence detection flow table entry (ADF) when the keepalive messages are missing is deleted because of the idle timeout (idt). The presence service (PS) ensures that the involved edge switches (ES) are configured to notify the controller (C) and in turn the presence service (PS) in case of a corresponding flow table entry (FTE) deletion. Hence the deletion of the absence detection flow table entry (ADF) generates a notification being sent to the presence service (PS) and the presence service (PS) uses this notification to update its monitored entities table (MET) changing the entities status to offline.

When the network entity status is set to offline, the entities location table (ELT) is updated to delete the network entities location from the corresponding entry. Moreover the presence service (PS) returns to the discovery phase (D) which is depicted with reference sign EWO in FIG. 4 and then the network entity (NE) is being un-subscribed EUS and after being un-subscribed the network entity (NE) is in status un-subscribed US again.

When a subscribed network entity (NE) is actively un-subscribed which is depicted with reference sign EUS then the presence service (PS) does not return to the discovery phase (D) but directly un-subscribes the corresponding network entity (NE) and then the network entity (NE) is again in the status un-subscribed US.

Further the presence service (PS) may be enabled to allow a user and/or a third party to check a subscribed network entities presence status either by pulling or pushing procedures which may be implemented by the presence service (PS).

It is also possible for subscribed network entity (NE) to change its location while remaining online, i.e. use the presence service while changing its location. In this case the subscribed network entity (NE) may send the keepalive messages to a different edge port (EP) of an edge switch (ES). The presence service (PS) would use the information of the packet_in message generated by the edge switch (ES) to update the location value in the entities location table (ELT), to delete the absence detection flow table entry (ADF) from the old location, i.e. the old edge switch (ES), and to install it at the new location, i.e. at a new edge switch (ES) assuming that in this case the user does not specify a location for the subscribed network entity (NE) during the entities subscription procedure.

Figure 5:
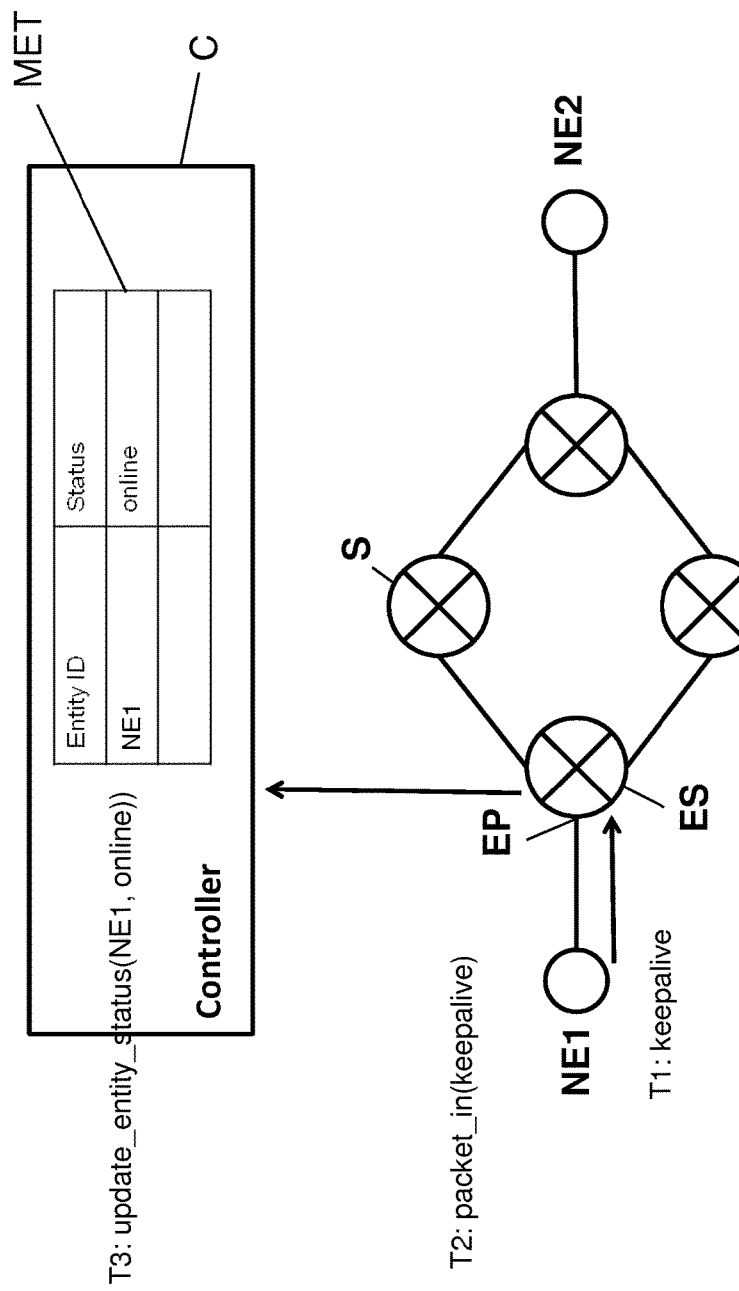
FIG. 5 shows part of steps of a method according to an embodiment of the present invention.

FIG. 5 shows part of steps of a method according to a third embodiment of the present invention. In FIG. 5 the events related to the discovery phase (D) termination are shown. The packet_in message generation locates the network entity (NE) within the network 1 and updates its presence status to online. In a first step T1 the subscribed network entity (NE1) sends a keepalive message (KAP) to the edge port (EP) of the edge switch (ES) to which the network entity (NE1) is directly connected. In turn in a second step T2 the edge switch (ES) sends packet_in information including keepalive information to the controller (C). In a third step T3 the controller (C) performs an update of the entity status of network entity (NE) changing the presence status to online in the monitored entity table MET.

Figure 6:
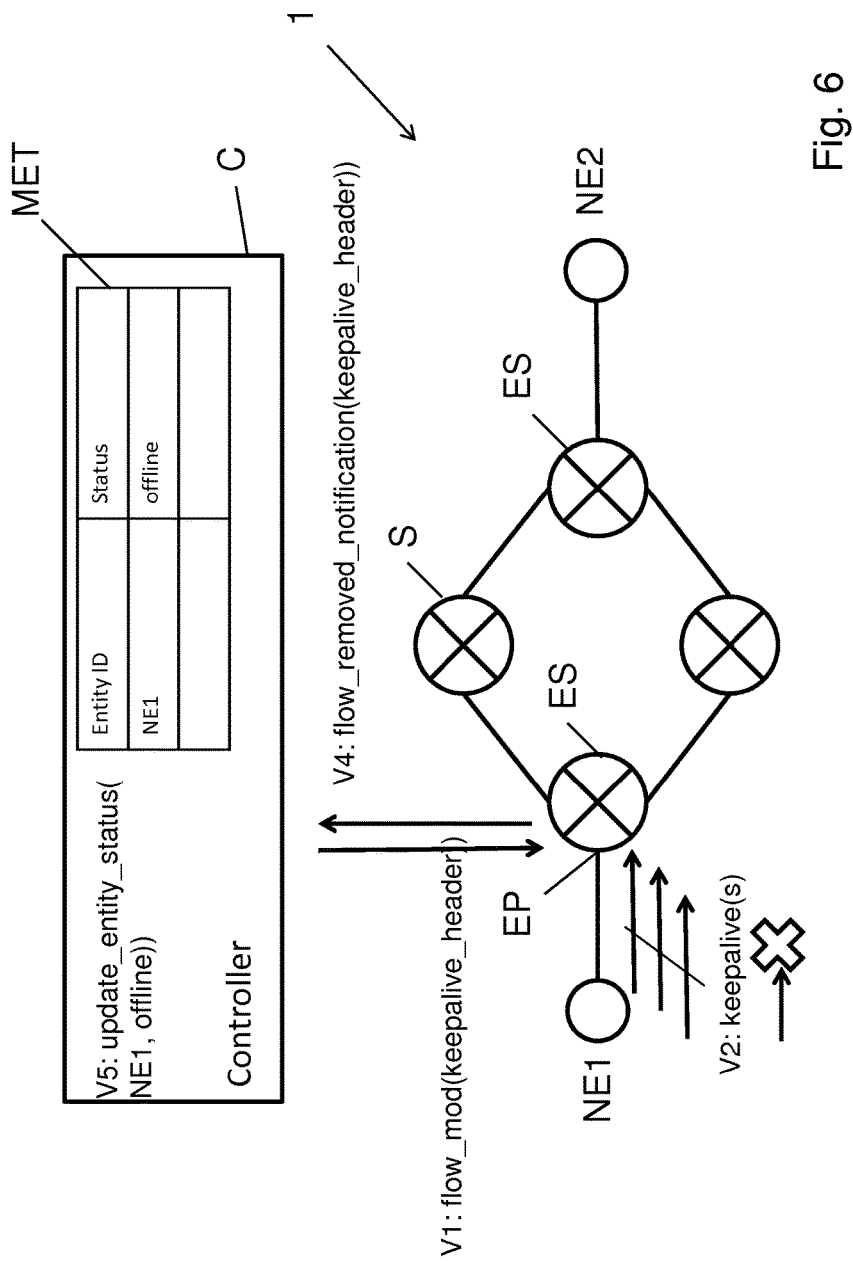
FIG. 6 shows part of steps of a method according to an embodiment of the present invention.

FIG. 6 shows part of steps of a method according to a fourth embodiment of the present invention. In FIG. 6 a termination of the listening phase (L) and transition to the discovery phase (D) is shown. A keepalive message was lost and the corresponding absence detection flow table entry (ADF) was then deleted. The edge switch (ES) notified the controller (C) and the presence service (PS). The presence status of the subscribed network entity (NE1) was changed to offline.

In more detail in a first step V1 the controller (C) has configured the edge switch of the subscribed network entity (NE1) by sending a flow modification message with keepalive headers for matching. Then in a second step V2 the subscribed network entity (NE1) has sent keepalive messages. In a third step V3 one or more keepalive messages were lost and then the edge switch (ES) sends a flow removed notification with the keepalive header back to the controller (C) that the edge switch (ES) has—upon the lost keepalive messages—removed a corresponding flow table entry (FTE). In a fifth step V5 the controller (C) updates the network entity status for the subscribed network entity (NE)1 from online to offline in its monitored entity table MET. After that the presence service (PS) returns to the discovery phase (D).

Figure 7:
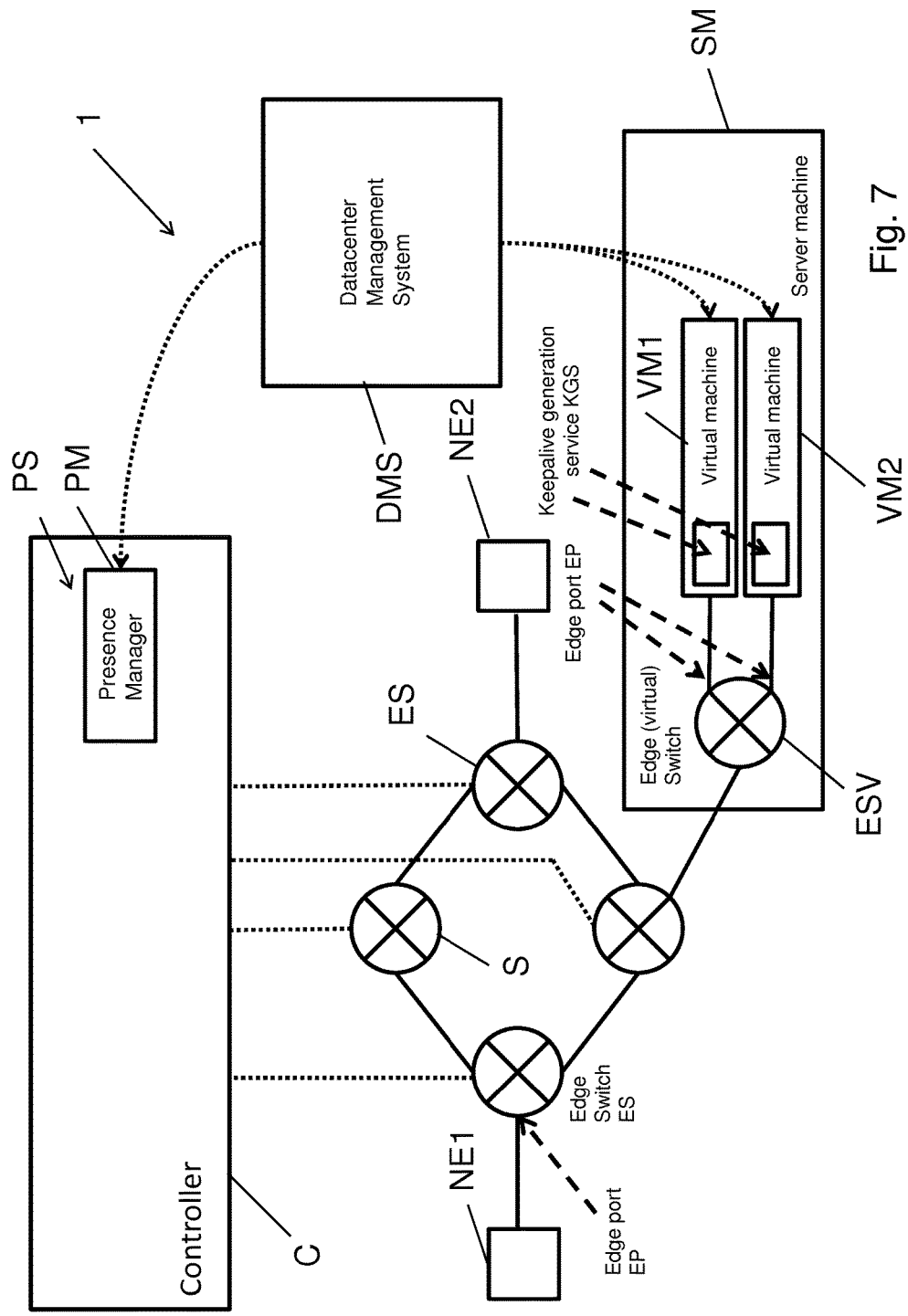
FIG. 7 shows a system according to an embodiment of the present invention.

FIG. 7 shows a system according to a fifth embodiment of the present invention. In FIG. 7 a data center embodiment is shown in which a virtual switch (ESV) in a server machine (SM) works as an edge switch (ES) hosting the absence detection flow table entry (ADF).

The presence service (PS) is provided by the presence manager (PM) to applications running in the data center 1. For instance an application is monitoring the presence of virtual machines (VM1, VM2) using the presence service for example to perform fault detection.

The virtual machines (VM1, VM2) are the network entities to be monitored by the presence service (PS) while the data center management system (DMS) is the user of the presence service (PS) provided by the presence manager (PM). The operating systems of the virtual machines (VM1, VM2) include an additional service (KGS) sending keepalive messages as required by the presence service (PS).

The data management system (DMS) in the process of starting a new virtual machine (VM1, VM2) performs a subscription request to the presence service (PS) wherein the data center management system (DMS) provides an identifier for the virtual machines (VM1, VM2) internally used as network entity identifier, a MAC address as packet match information of the virtual machine (VM1, VM2), a keepalive period which is specified to be for example one second and finally since the data center management system (DMS) is in charge of deciding the location of a virtual machine (VM1, VM2), also the network location of the virtual machine (VM1, VM2).

Of course the concept of a virtual edge switch (ESV) which is in FIG. 7 hosted by the server machine (SM) can be generalized, i.e. an edge switch is a switch to which a network entity is directly connected either being a physical entity or a virtual entity. The same applies for the network entity (NE) to be monitored by the presence service (PS). In FIG. 7 a virtual machine (VM1, VM2) with a keepalive generation service (KGS) is the network entity to be monitored by the presence service. The term "network entity" is to be understood either as a physical entity and/or as a virtual entity.

Figure 8:
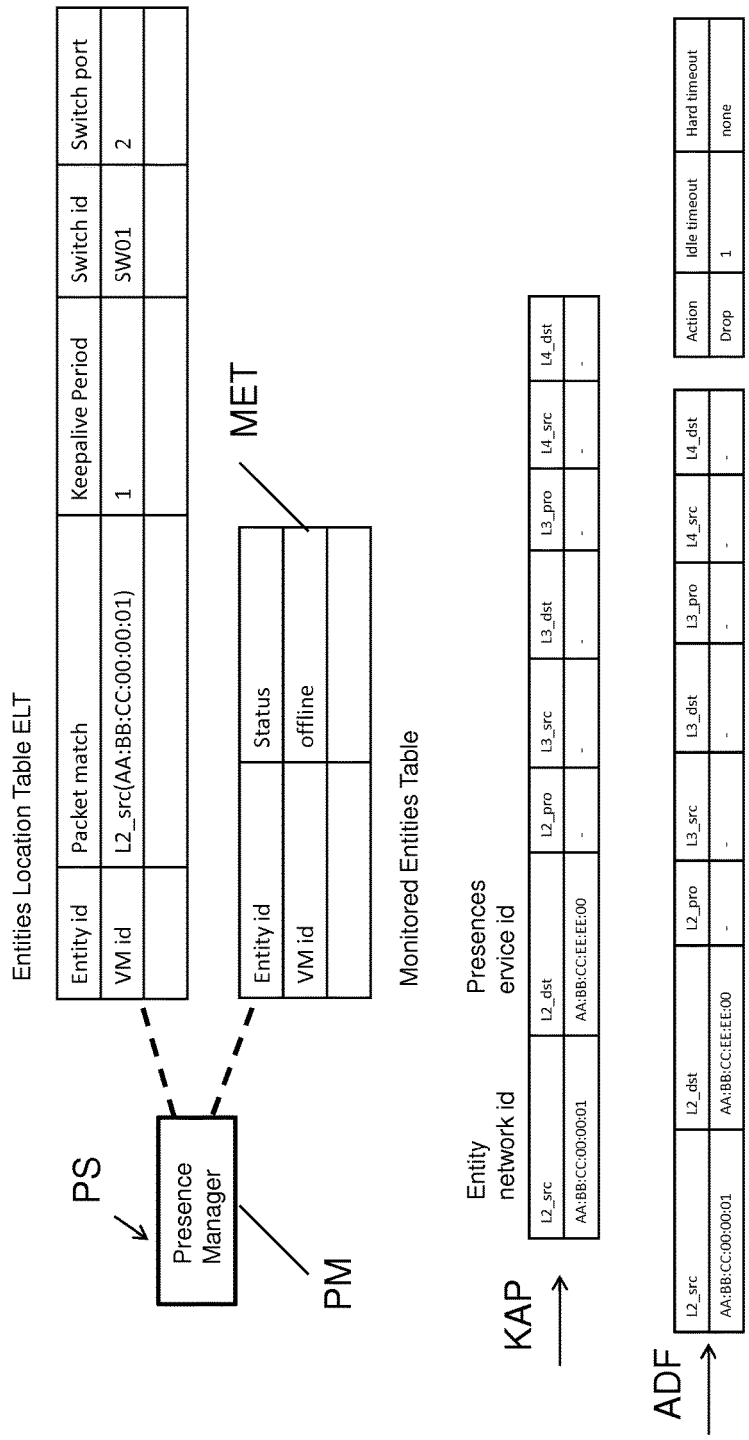
FIG. 8 shows presence service internal state and keepalive packets generated according to an embodiment of the present invention.

FIG. 8 shows presence service internal state and keepalive packets generated according to a sixth embodiment of the present invention. In FIG. 8 presence service internal state tables, keepalive packets as well as absence detection flow table entries (ADF) are shown for the system of FIG. 7. In the upper half of FIG. 8 the presence service internal state tables after the network entity subscription request for the virtual machine (VM1, VM2) are shown. The entities location table (ELT) includes the virtual machine ID, packet match information with the keepalive period of one second and a corresponding switch ID SW01 to which the virtual machine corresponding to the virtual machine ID is connected via switch port 2.

The monitored entities table (MET) includes the virtual machine ID and its status being offline at the end of the subscription process. In the middle of FIG. 8 the keepalive packet (KAP) generated by the keepalive generation service (KGS) running in the virtual machines (VM1, VM2) of the server machine (SM) according to the embodiment of FIG. 7 is shown. The keepalive generation service (KGS) running in the virtual machines operating system generates a keepalive packet (KAP) and transmits it within a period of one second. The packet carries the L2_scr of the virtual of the virtual machine (VM1, VM2) which works as network entity identifier on the network. The L2_dst enables an identification in the sense that the network packet is a keepalive message destined to the presence service (PS) of the presence manager (PM). The L2_dst serves therefore as service identifier, i.e. in this case it is the presence service ID.

In the lower part of FIG. 8 an absence detection flow table entry (ADF) is shown which is being installed into the edge virtual switch (ESV) located in the server machine (SM) in the embodiment of FIG. 7. The idle timeout (idt) is one second and the corresponding action is to drop any packet and for the absence detection flow table entry (ADF) no hard timeout ht is specified. Every network packet arriving at the edge switch (ESV) is then dropped when being destined for the presence service according to the presence service identifier.

Figure 9:
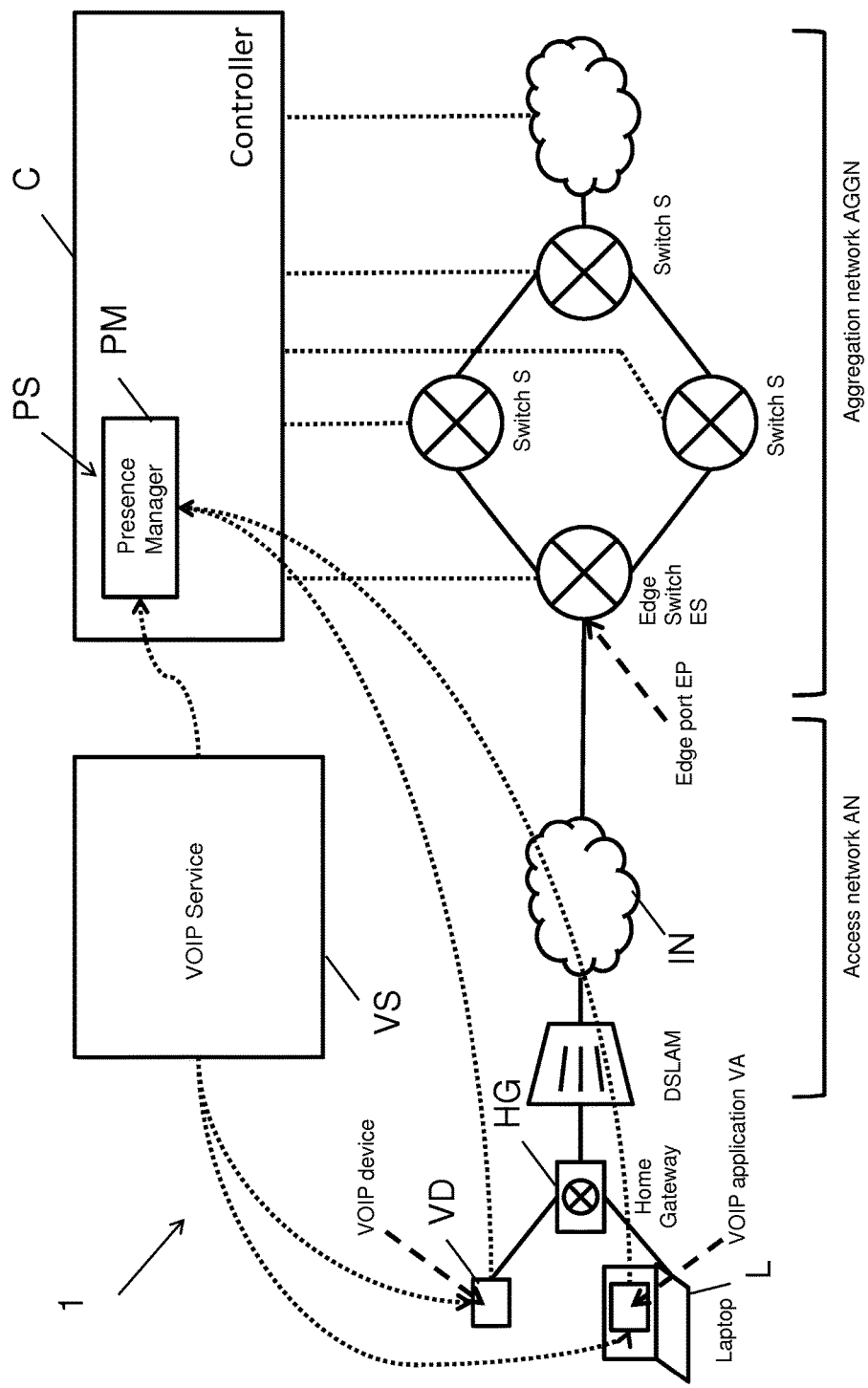
FIG. 9 shows a system according to an embodiment of the present invention.

FIG. 9 shows a system according to a seventh embodiment of the present invention. In FIG. 9 an embodiment in which the presence service (PS) provided by the presence manager (PM) is used for an implementation of a Voice-over-IP service in an operator's network. An aggregation network (AGGN) is again provided in a similar way as the networks in the previous figures. Switches (ES, S) are used to forward packets within the network wherein each of the switches (S, ES) may be configured by a controller (C) via a control channel. The presence manager (PM) is implemented in the controller (C) of the aggregation network (AGGN). Further in FIG. 9 an access network (AN) is connected to an edge switch (ES) by an edge port (EP). The access network (AN) comprises part of the internet IN and a DSLAM which is used as aggregation point for the "last mile" from a laptop L on which a Voice-over-IP application (VA) is running and which is connected via home gateway (HG) to the DSLAM. Also a dedicated Voice-over-IP device (VD) is connected to the home gateway (HG) is connected to a Voice-over-IP service (VS).

The embodiment of FIG. 9 can enable an operator to provide a "buddy list" service to its customers or the operator can use this information for management and orchestration of its network. In the aggregation network (AGGN) a network similar to a software defined network (SDN) is enabled. The aggregation network (AGGN) is as already mentioned above—connected to the DSLAM which finally provides the "last mile" connection with a home gateway (HG) at the network subscriber's premise. The subscriber may use either ad-hoc Voice-over-IP devices (VD) provided by the operator or a Voice-over-IP application, for example running in a subscriber's laptop L. The Voice-over-IP device (VD) and the Voice-over-IP application (VA) are the network entities to be monitored by the presence service (PS) provided by the presence manager (PM). The user of the presence service (PS) is in FIG. 9 the Voice-over-IP service (VS) as implemented by a network operator. The Voice-over-IP service (VS) delegates the subscription process to each one of the Voice-over-IP applications. For instance the Voice-over-IP device (VD) and the Voice-over-IP application (VA) may perform the subscription process by themselves. The delegation may happen for example using a signed declaration certificate to be provided by the Voice-over-IP service (VS) to each network entity (VA, VD).

A subscription request of the network entities (VA, VD) may be performed using a UDP packet with destination specified to a well-known IP address and/or port number that is provided by the network operator as presence service "end point". This "end point" of the presence service (PS) does not require to be actually mapped to a real network node or entity since it only serves as identifier for the presence service (PS). The subscription request comprises preferably the following information: A hash of the signed declaration certificate working as identity identifier, packet match information based on the combination of public source IP address and source port number of the network entity to be subscribed and a keepalive period value of 10 seconds. Of course the 10 seconds are only an example.

FIG. 10 shows presence service internal state tables and keepalive packets generated according to a method according to an eighth embodiment of the present invention. In FIG. 10 the internal status of the presence service after the subscription request a keepalive packet generated and the absence detection flow table entry is shown. In the upper half of FIG. 10 the presence service internal state tables after entity subscription request is shown for the embodiment of FIG. 9. Both the Voice-over-IP application (VA) and the Voice-over-IP device (VD) will start sending keepalive packets (KAP) as soon as the subscription of them has been performed. This ensures that the presence service (PS) can correctly work even if the home gateway (HG) is performing network address port translation (NAPT). The network address port translation (NAPT) as implemented usually in home gateways HG establishes a short lived UDP binding between the internal IP address and port pair and the external IP address. When either the Voice-over-IP device (VD) or the Voice-over-IP application (VA) performs the subscription request, the presence service (PS) can read the port number assigned by the network address port translation (NAPT) at the home gateway (HG) from the received network packet carrying the subscription request.

Since the keepalive packets (KAP) will be sent right after the subscription request and they will be forged to maintain the same IP addresses and port numbers the network address port translation (NAPT) function will be applied using the same binding enabling the presence service (PS) at correctly recognizing them. Such a keepalive packet (KAP) is shown in the middle of FIG. 10. The generating keepalive packets (KAP) by the Voice-over-IP application (VA) or by the Voice-over-IP device (VD) comprising the source IP address and port number which work as entity network identifier (ENID) on the network. The destination IP address and port number are instead the presence service identifier (PSID).

After a subscription has been performed the presence service (PS) installs the absence detection flow table entry (ADF) in the corresponding edge switch (ES) connected to the DSLAM. The installed absence detection flow table entry is shown at the bottom of FIG. 10.

The DSLAM is not required to maintain a fixed route going through the edge switch (ES) where the absence detection flow table entry (ADF) was first installed. In fact for example in case of traffic engineering that changes the network path used by the DSLAM to connect the aggregation network (AGGN) the presence service (PS) would recognize that as a (network) location change. As already described above, this would eventually generate a new packet_in message comprising the keepalive received at the new switch. The presence service (PS) would then use the information of the packet_in message to update the location value in the entity's location table (ELT) to delete the absence detection flow table entry (ADF) from the old location and to install it at the new location.

Further a Voice-over-IP device (VD) or a Voice-over-IP application (VA) may always perform a new subscription request when there is a network disconnection detected, for example because the Voice-over-IP device (VD) or Voice-over-IP application (VA) were turned off and/or rebooted. This enables the presence service (PS) at detecting a network address port translation (NAPT) mapping change and at updating the old subscription state.

The present invention enables a presence service (PS) to be implemented directly into a network exploiting preferably the software defined network paradigm. The presence service logic is preferably implemented in a control plane of the network in a logical component called presence manager (PM). The presence manager (PM) can be deployed in one or as a combination of the following ways as shown in FIG. 2: as an extension to the network controller logic, as an external entity that interacts with the controller (C), as an external entity that interacts with several controllers C1-C4 to provide to each network the presence service, it is also possible that more than one presence managers (PM1, PM2) are connected to a single controller (C). In this case the controller (C) will be provided with an event dispatcher (ED) logic that selects the right presence service (PS) that has the right to handle a given network event.

In other words the present invention preferably provides a system and method to monitor the presence and/or the absence of a network entity in which the presence detection function is distributed into the network switches. The network entity sends packets carrying meta-data that are used to identify such entity and only presence status change events are notified by the switches. Further the presence service enables a detection of the presence and/or the absence of a network entity also in case the network entity changes its network location.

The presence service further enables a detection of the presence and/or absence of a network entity also in case the entity is connected to the network through a network address port translation (NAPT) function. Preferably a registration operation for the entity to be monitored is provided requiring the specification of the meta-data to be used by the network entity to forge the network packets which are used by the network switches in order to detect the present status.

Embodiments of the present invention may further enable the use of flow caches on network devices for implementing a distributed presence service.

Embodiments of the present invention may have, inter alia, the following advantages: the use of keepalive packets only at the very edge of the network, optimizing the network-wide resources usage, substitution of as much as possible a poll system with a push one where only status changes are notified in contrast to conventional methods and systems in which the status information needs to be periodically refreshed.

Embodiments of the present invention may further exploit cheap resources at the network switches to maintain a distributed state for a high number of entities which in conventional systems would require a consistent number of dedicated resources, for example several servers at a data center. The present invention enables a scaling with the number of status changes instead of scaling with the number of messages sent reducing network traffic for the presence service Even further scaling together with the optimized usage of network resources enables an offload to the network of a service that otherwise would be provided by applications at the edge of the network. The network, i.e. the network operator, can then consolidate the service for several customers.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for monitoring a status in a form of presence and/or absence of a subscribed network entity in a network by a presence service, wherein the network is a software defined network comprising one or more forwarding elements configurable for recognizing and applying one or more actions on packets being forwarded by the forwarding elements and one or more network entities, wherein the one or more network entities are connectable to one or more of the forwarding elements, the method comprising:
monitoring the status of the subscribed network entity when the subscribed network entity is discovered by the presence service, wherein the monitoring the status of the subscribed network entity comprises:
a) providing the presence service with a status update of the subscribed network entity only when at least one of the one or more forwarding elements, to which the subscribed network entity is directly connected, has detected a change in the presence status of the subscribed network entity; and
b) dropping packets of the subscribed network entity destined for the presence service.

2. The method according to claim 1, wherein, for performing a) and b), a rule on one of the one or more forwarding elements is installed to identify packets of the subscribed network entity destined for the presence service, and
wherein a drop action is performed when packets match the rule.

3. The method according to claim 1, wherein the subscribed network entity becomes subscribed by sending a request to the presence service comprising identity information of the subscribed network entity and matching information to the presence service.

4. The method according to claim 3, wherein the request comprises keepalive information including a keepalive period indicating the frequency at which said entity provides keepalive messages.

5. The method according to claim 3, wherein the matching information is generated by the presence service.

6. The method according to claim 3, wherein the matching information includes one or more values of header fields of a packet.

7. The method according to claim 1, wherein a subscription of the subscribed network entity at the presence service expires after a certain expiration time and/or upon explicit cancellation.

8. The method according to claim 1, wherein the subscription of the subscribed network entity to a presence service is initiated by a user of the network entity by delegating the request for submission to a dedicated entity.

9. The method according to claim 1, wherein for delegating the request for submission to a dedicated entity a signed delegation certificate is provided for the dedicated entity.

10. The method according to claim 1, wherein the presence service stores at least temporarily a current location of the subscribed network entity.

11. The method according to claim 1, wherein information of monitored entities is stored by the presence service.

12. The method according to claim 2, wherein the installed rule has an idle timeout related to an offline detection delay of the presence service.

13. The method according to claim 12, wherein the presence service and/or a controller of the forwarding elements is informed when the idle timeout has caused a deletion of the installed rule.

14. The method according to claim 1, wherein, when the subscribed network entity changes its location to a different forwarding element, the presence service deletes the rule on the previous forwarding element and installs the rule on the different forwarding element, wherein the different forwarding element initiates an update discovery of said network entity connected to the different forwarding element.

15. A presence service entity for providing a presence service for monitoring a status in form of presence and/or absence of a subscribed network entity in a network, wherein the network is a software defined network comprising one or more forwarding elements configurable for recognizing and applying one or more actions on packets being forwarded by the forwarding elements and one or more network entities, wherein the network entities are connectable to one or more of the forwarding elements, the presence service entity being configured to:
provide monitoring the status of the subscribed network entity when the subscribed network entity is discovered by the presence service, wherein the monitoring the status of the subscribed network entity comprises:
a) providing the presence service with a status update of the subscribed network entity only when at least one of the one or more forwarding elements, to which the subscribed network entity is directly connected, has detected a change in the presence status of the subscribed network entity; and
b) dropping packets of the subscribed network entity destined for the presence service.

16. A software-defined network with a presence service for monitoring a status in form of presence and/or absence of a subscribed network entity, the software-defined network comprising:
one or more forwarding elements configurable for recognizing and applying one or more actions on packets being forwarded by the forwarding elements; and
one or more network entities, wherein the network entities are connectable to the one or more of the forwarding elements,
wherein the presence service is configured to:
provide monitoring the status of the subscribed network entity when the subscribed network entity is discovered by the presence service, wherein the monitoring the status of the subscribed network entity comprises:
a) providing the presence service with a status update of the subscribed network entity only when at least one of the one or more forwarding elements, to which the subscribed network entity is directly connected, has detected a change in the presence status of the subscribed network entity; and
b) dropping packets of the subscribed network entity destined for the presence service.

* * * * *